United States Patent

Woodford et al.

[11] 3,976,131
[45] Aug. 24, 1976

[54] PITLESS ADAPTER WITH PRESSURIZED SEAL

[75] Inventors: John D. Woodford, Le Claire; Trueman W. Hiller, Bettendorf, both of Iowa

[73] Assignee: Weil-McLain Co., Inc., Dallas, Tex.

[22] Filed: Jan. 17, 1975

[21] Appl. No.: 541,767

[52] U.S. Cl. .................................. 166/85; 166/88; 285/106
[51] Int. Cl.² .................... E21B 33/03; F16L 55/00
[58] Field of Search ............ 166/85, 88; 277/3, 201; 285/106, 199

[56] References Cited
UNITED STATES PATENTS

| | | | |
|---|---|---|---|
| 2,485,497 | 10/1949 | Lemley et al. | 166/88 |
| 3,847,217 | 11/1974 | Kramer | 166/85 |

*Primary Examiner*—James A. Leppink
*Attorney, Agent, or Firm*—Lane, Aitken, Dunner & Ziems

[57] ABSTRACT

An improved pitless well adapter including a supported unit connected to a pump drop pipe and mating with a hanger unit. The hanger unit includes a body portion defining a passageway aligned with a passageway in the supported unit and a nipple portion extending outwardly through an aperture formed in a well casing below the ground surface. A sealing arrangement pressurized by pumped fluid is provided around the casing aperture and, preferably, an anti-syphon check valve is disposed in a seal pressurization passageway leading to the seal arrangement to prevent depressurization of the seal and contamination of the well upon reverse flow of the pumped fluid in the pump drop pipe. Double gaskets in one embodiment from a sealed chamber pressurized by pumped fluid entirely inside of the well casing about the casing aperture.

10 Claims, 10 Drawing Figures

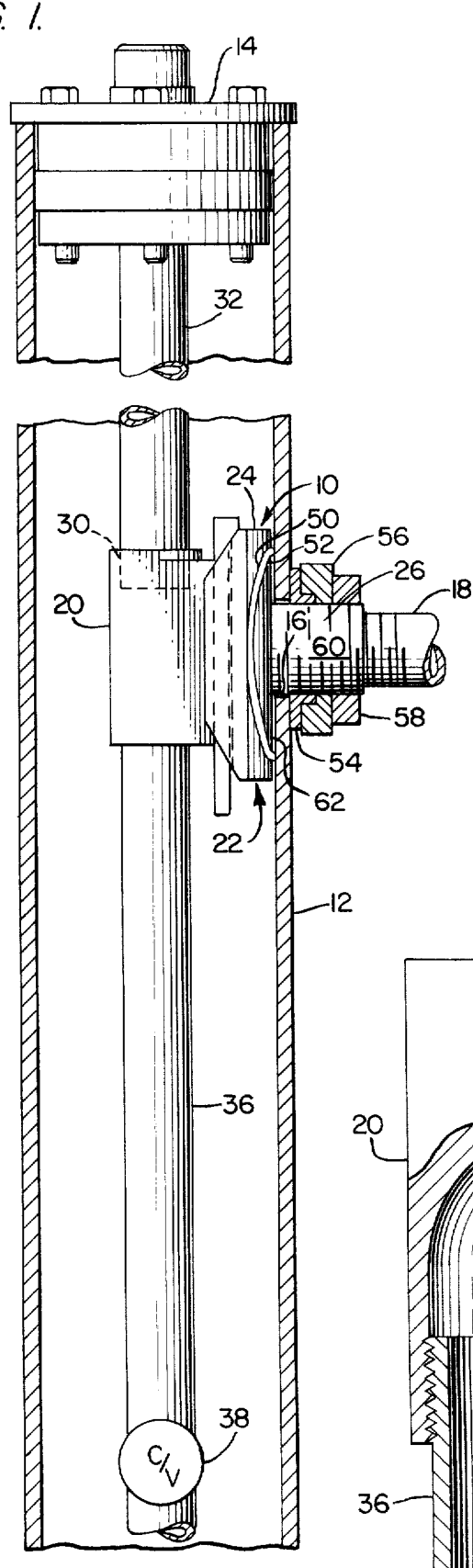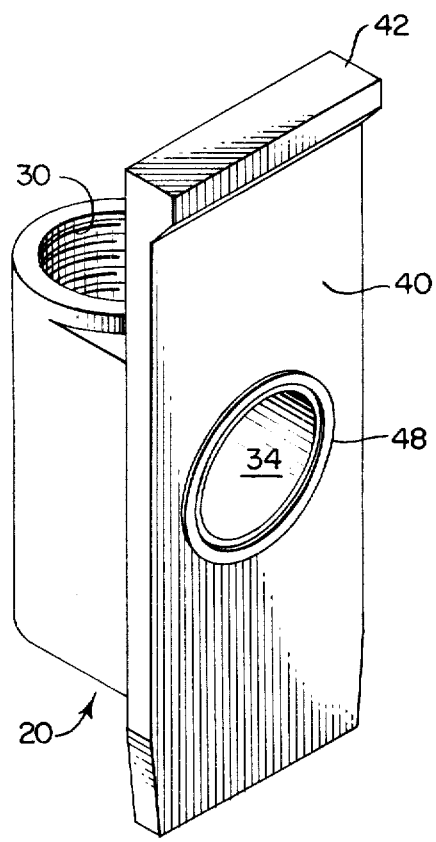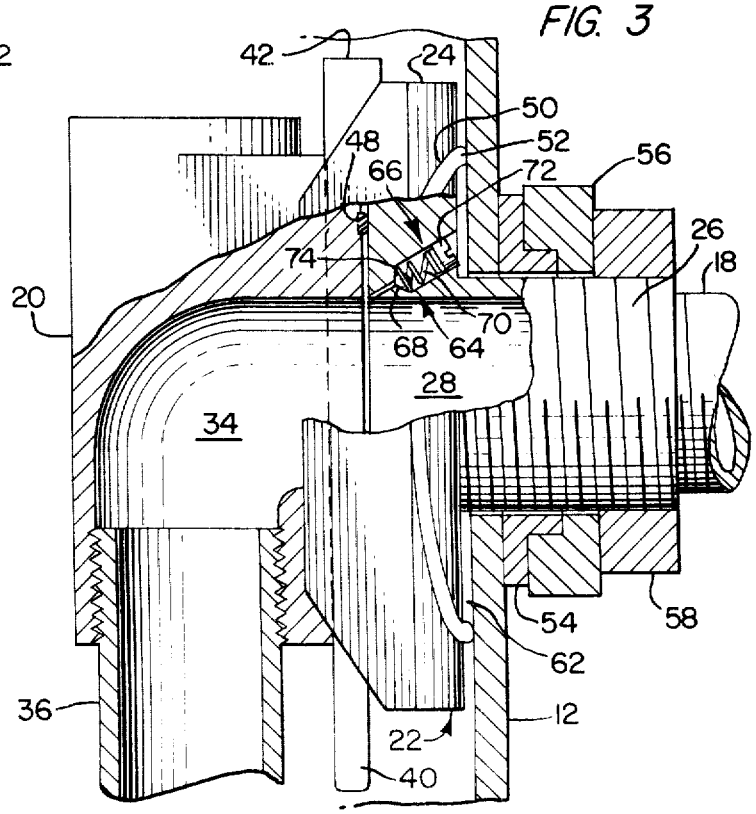

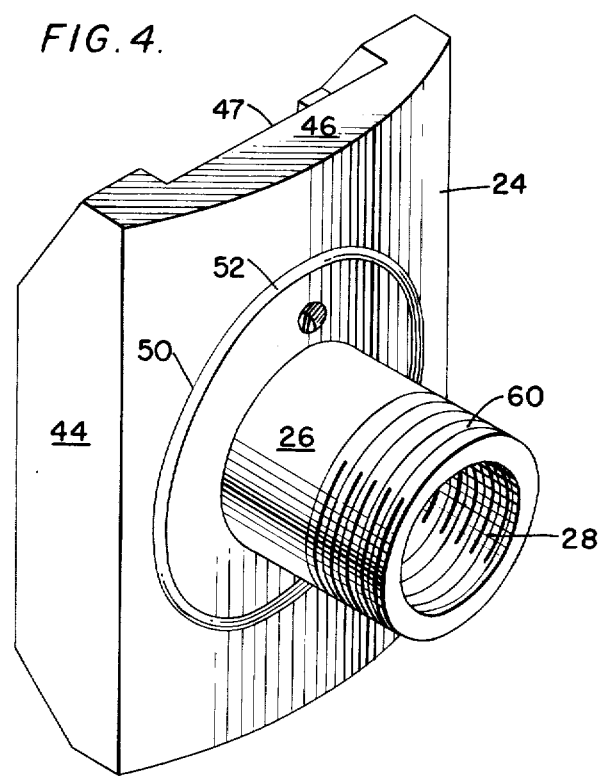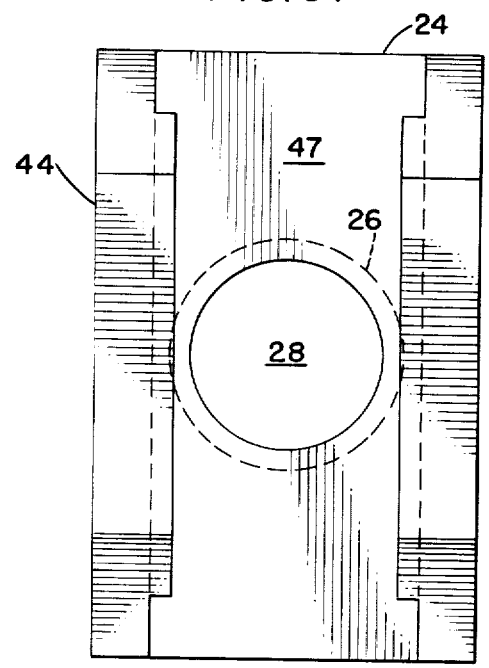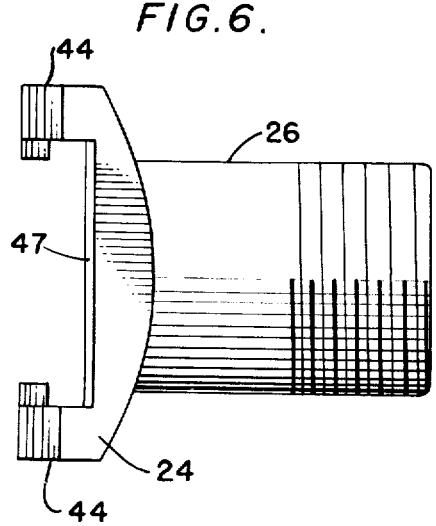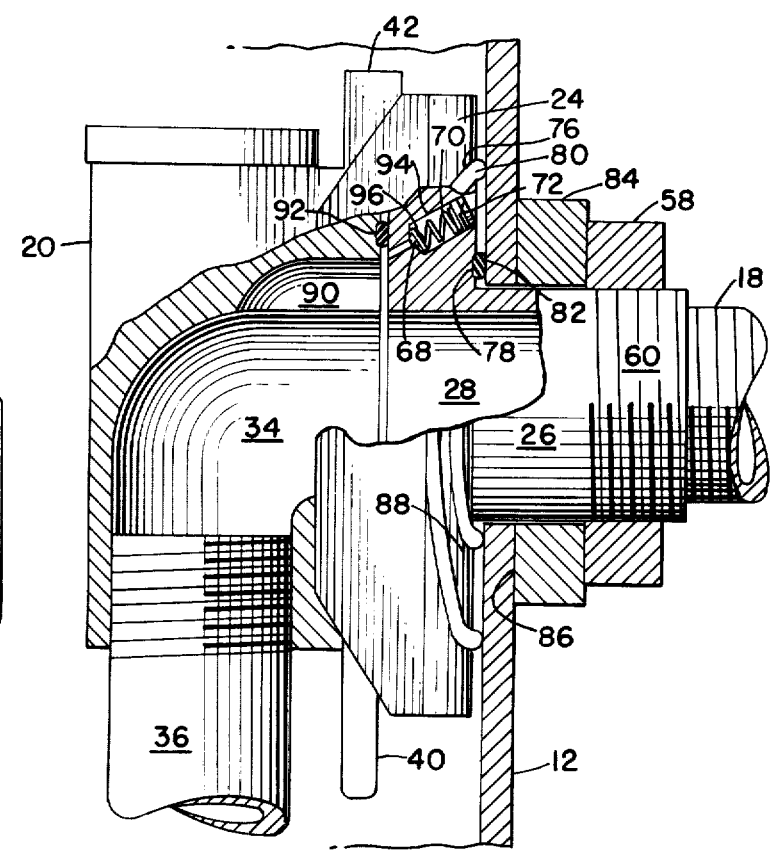

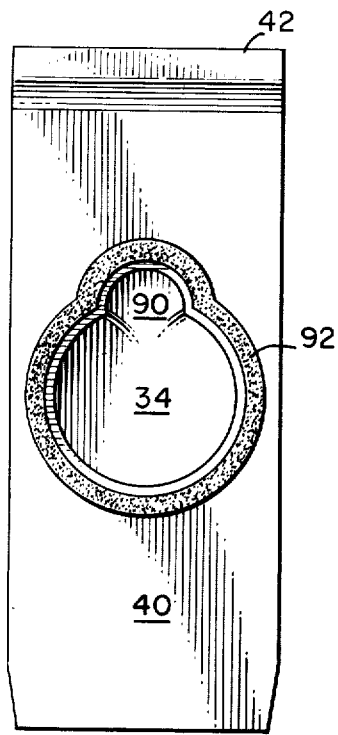
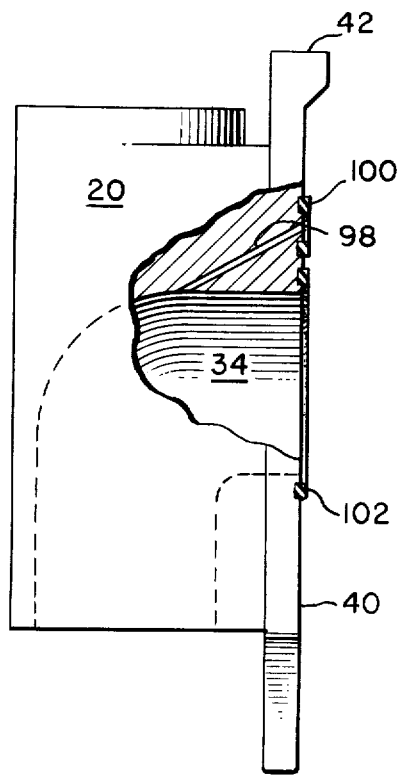
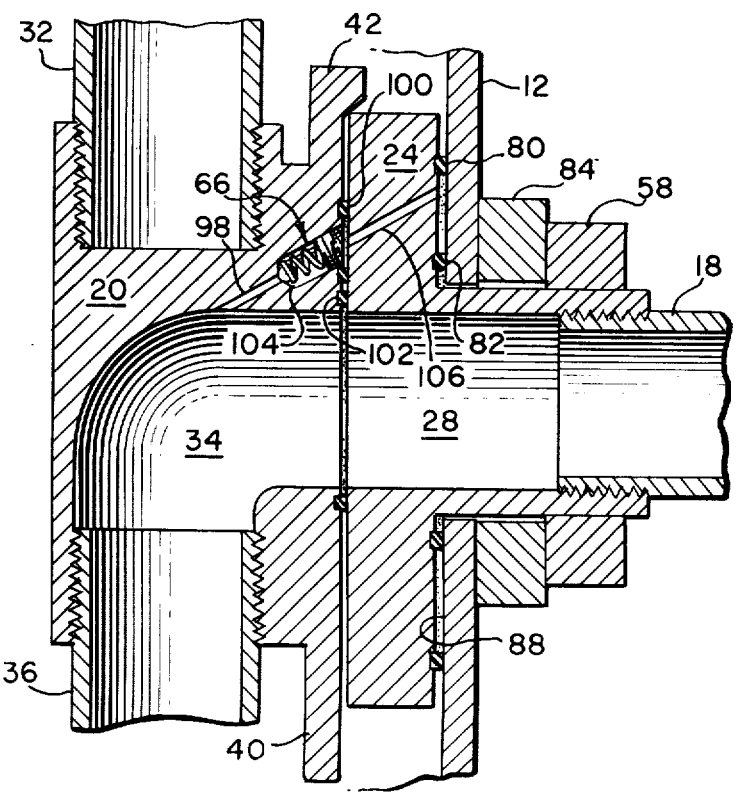

PITLESS ADAPTER WITH PRESSURIZED SEAL

BACKGROUND OF THE INVENTION

This invention relates to a pitless well adapter and more particularly, it concerns a unique pitless adapter having a pressurized seal arrangement employing an anti-syphon check valve.

In early well systems employing a submersible type pump disposed within a well casing, a pit was formed around the well casing to a depth below the frost line. A delivery line was connected to the pump discharge line at the bottom of the pit where the casing was severed. From this point, the pumped fluid was directed underground to a storage tank or the like. This arrangement was unsatisfactory since employment of the pit permitted contamination of the well water by surface water. Further, due to the fact that the majority of these well systems were employed in rural areas in close proximity to residential waste treatment facilities, such as septic tank arrangements, the well water could be contaminated with human waste making it totally unfit for consumption.

As a result of these problems a pitless-type well was developed employing a two-part adapter connecting a delivery line to the pump through the well casing at a point below the frost line with the well casing extending above the surface. An example of this type of arrangement may be found in U.S. Pat. No. 2,689,611 to Martinson. As shown in this patent, a two-part adapter is employed including a hanger unit having a pipe nipple extending through an aperture formed in the well casing to which the delivery line is connected and a supported unit adapted to be supported by the hanger unit. The supported unit includes an L-shaped passage mating with the passage formed in the hanger unit. A drop pipe, disposed within the well casing, is connected to a submersible pump at one end and to the supported unit at the other end. A lift pipe is connected to the supported unit and serves as a means for positioning the pump and supported unit within the well casing. A gasket is placed in sealing engagement with the well casing around the pipe nipple portion of the hanger unit to prevent leakage of surface water and other contaminants into the well casing. However, in the event of gasket failure during service due to natural deterioration or due to improper installation, surface water would leak into the well casing and contaminate the well water.

As a result of this primary shortcoming, various sealing arrangements were developed for use between the well casing and the pitless adapter in an attempt to prevent contamination of the well water in the event of seal failure. An example of such an arrangement may be found in U.S. Pat. No. 3,306,358 to Williams. As disclosed in this patent, a two-part adapter, similar to the adapter disclosed by Martinson, is employed. However, inner and outer gaskets are placed between the hanger unit and well casing to define a pressure chamber. A passageway or aperture is formed in the hanger unit to permit communication of the pumped fluid with a pressure chamber defined by the inner and outer gaskets, the hanger unit and the well casing, thereby pressurizing the seal. See also Williams U.S. Pat. Nos. 3,403,730 and 3,561,796.

In the event of seal failure, while the fluid is being pumped, leakage would occur in an outward direction thereby preventing contamination of the pumped fluid by surface water. However, due to the fact that these systems generally employ a check valve disposed within the drop pipe (or associated with the submersible pump) which is subject to leakage as a result of wear or which may in fact have a designed-in leakage rate, water within the discharge line will flow downward, i.e., in a reverse direction, anytime that the pump shut off. Because the end of the delivery line connected to the residence is effectively closed, the receding water level in the delivery line draws a partial vacuum behind it. If this level recedes past the pitless adapter down the drop pipe, the seals in the Williams patent can be subjected internally to below atmospheric pressure. In the event of seal failure when this condition is present, ground water will enter the drop pipe through the passage which communicates with the now depressurized seal. This condition is potentially more dangerous than the leakage condition of the pitless adapter disclosed by the Martinson patent in that ground water directly enters the pumped fluid within the drop pipe and does not merely enter the well casing where it would be diluted with the water at the bottom of the well.

SUMMARY OF THE INVENTION

In accordance with the present invention, an improved pitless well adapter is provided by which contamination of the well water is prevented in all modes of seal failure. Specifically, a two piece pitless well adapter is provided including a hanger unit having a pipe nipple extending through an aperture formed in the well casing and having a body portion adapted to mate with a supported unit from which a drop pipe connected to a submersible pump is suspended within the well casing. A gasket arrangement is employed to seal the aperture in the well casing through which the pipe nipple of the hanger unit extends thereby defining with the hanger unit and the well casing a pressure chamber. In one gasket arrangement double gaskets form a sealed pressure chamber entirely inside of the well casing. A passageway is formed in either the hanger unit or the supported unit to permit communication of the pumped fluid to this pressure chamber. An anti-syphon check valve is disposed within this passageway and functions to prevent depressurization of the seal and leakage upon reverse flow of the pumped fluid capable of creating a vacuum in the area of the adapter.

BRIEF DESCRIPTION OF THE DRAWINGS

FIG. 1 is a partial, vertical sectional view of a well including a preferred form of a pitless well adapter in accordance with the present invention;

FIG. 2 is a perspective detail view of the supported unit of FIG. 1;

FIG. 3 is a cross-sectional view of the preferred form of a pitless well adapter in accordance with the present invention.

FIG. 4 is a perspective detail view of the hanger unit of FIG. 2;

FIG. 5 is a rear view of the hanger unit of FIG. 4;

FIG. 6 is a plan view of the hanger unit of FIG. 4;

FIG. 7 is a side view in partial section of a pitless adapter illustrating an alternative form of the invention;

FIG. 8 is a front view of the supported unit of FIG. 7;

FIG. 9 is an alternative embodiment of a supported unit capable of use with the hanger unit of FIG. 7; and FIG. 10 is a cross-sectional view of another embodiment of the invention.

DETAILED DESCRIPTION OF THE PREFERRED EMBODIMENTS

The preferred embodiment of a pitless well adapter in accordance with the invention is illustrated in FIGS. 1–6 and designated generally by the reference numeral 10. The pitless well adapter 10 is employed with a well having a casing 12 permitting entry of water into its lower end. The upper end of the casing 12 which normally terminates just above ground level, is provided with a suitable sealed closure 14 to prevent entry of contaminants.

The well casing 12 is formed with an aperture 16 below its upper end at a point below the frost line determined for the particular geographic region of the well installation. The aperture 16 is also at the same underground level as a delivery line 18 supplying water to a residence, for example.

The pitless adapter 10, as best seen in FIG. 3, is in two parts: a supported unit 20 and a hanger unit 22. The hanger unit 22 includes a body portion 24 disposed inside the well casing and a pipe nipple portion 26 which extends outwardly through the well casing aperture 16. The forward surface of the body portion 24 is convex so as to conform with the inner cylindrical surface of the well casing 12. The hanger unit 22 is formed with a passageway 28 (FIG. 3) extending therethrough and communicating with the delivery line 18 which is threadably connected to the pipe nipple 26 of the hanger unit 22.

The supported unit 20 is formed with a threaded bore 30 at its upper end for receiving the lower threaded end of a lift pipe 32. The lift pipe 32 extends upwardly and is secured to the well casing closure 14. Further, the supported unit 20 is formed with a 90° passageway 34 which aligns at its upper or outlet end with the hanger unit passageway 28. A drop pipe 36 is connected to the lower or inlet end of the supported unit passageway 34 at one end and at its opposite end to a suitable pump (not shown) disposed within the well casing. A check valve 38 is disposed intermediate the ends of the drop pipe 36 and often is incorporated with the pump.

As seen in FIG. 2, the supported unit 20 is formed with a tapered wedge plate 40 having at its upper end a stop flange 42. The tapered wedge plate 40 of the supported unit 20 is adapted to mate with a dove-tail arrangement formed as part of the body portion 24 of the hanger unit 22. As best seen in FIGS. 5 and 6, the body portion 24 of the hanger unit 20 includes a rearwardly extending dove-tail, socket-like flange arrangement 44 dimensioned so as to receive the tapered wedge plate 40 of the supported unit 20 (as in the above-referenced Martinson patent). The stop flange 42 abuts against the edge of the upper surface 46 of the body portion 24. As seen in FIG. 6, surface 47 of the face of the dove-tailed flange arrangement 44 is beveled so as to abut with the forward surface of the tapered wedge plate 40.

During installation of a well employing the pitless adapter of the invention, the hanger unit would be secured with its nipple portion 26 extending through the well casing aperture 16. The pump (not shown), drop pipe 36, and supported unit 20 would then be lowered into the well casing by the lift pipe 32 so that the tapered wedge-plate 40 of the supported unit 20 is dropped into the dove-tail flange arrangement 44 formed as part of the body portion 24 of the hanger unit 22.

A circular gasket 48 is positioned on the wedge plate 40 in a groove formed around the outlet end of the supported unit passageway 34. The connection between the supported unit 20 and the hanger unit 22 is thus sealed to prevent leakage of pumped fluid at this connection out into the interior space of the well casing.

The employment of the wedge plate 40 and the hanger unit 22, permits the combined weight of the supported unit 20, drop pipe 36 and pump unit (not shown) to force the gasket 48 into sealing engagement with the hanger unit 22.

As seen in FIGS. 1 and 4, a continuous annular groove 50 is formed in the convex surface of the body portion 24 of the hanger unit 22 to receive a ring-shaped gasket 52. As shown, this gasket 52 abuts against the inner surface of the well casing 12. A lip seal 54 (FIG. 3) is disposed on the pipe nipple portion 26 of the hangar unit 22 in abutting relationship with the outer surface of the well casing 12. The lip seal 54 is abutted by a collar 56 which in turn contacts a clamping nut 58 disposed on an externally threaded portion 60 of the pipe nipple 26. Tightening of the nut 58 during installation, serves to draw the body portion 24 of the hanger unit 22 towards the inner surface of the well casing 12 thereby placing the inner gasket 52 and outer lip seal 54 in sealing engagement with opposite sides of the well casing 12. Further, the gasket 52 in cooperation with the casing 12, the hanger unit 22 and the lip seal 54 define a chamber 62 surrounding the well casing aperture 16.

A seal pressurization passageway 64 (FIG. 3) is formed in the body portion 24 of the hanger unit 22 so as to permit communication between the hanger unit passageway 28 and the chamber 62. In this manner, pumped fluid passing through the pitless adapter 10 to the delivery line 18 is permitted to pass into the chamber 62 thereby pressurizing the seal arrangement. Upon failure of the seal 54, leakage would be in an outward direction and contamination of the pumped fluid would be prevented. However, as discussed above, due to leakage at the check valve 38 when the pump is off, reverse flow occuring in the delivery line 18 and within the passageways 28 and 34 can lower the pressure below atmospheric at the seal pressurization passageway 64. Unless provision is made to prevent depressurization of the chamber 62, contaminants could enter directly into the drop pipe 36. To prevent this mode of seal failure, an anti-syphon check valve 66 is disposed within the seal pressurization passageway 64. The anti-syphon check valve 66 includes a spherical valve element 68 biased against a conical valve seat 74 by a spring 70 connected at its opposite end to an apertured retainer 72 fixed in the passageway 64. As shown, the valve seat 74 may be formed integrally with the body portion 24.

The spring 70 is selected so that the fluid pressure in the passageways 28, 34 and 64 will be sufficient to move the spherical valve element 68 off its valve seat 74 to thereby permit fluid to pass through passageway 64 to pressurize the chamber 62. Whenever the pressure in the passageway 28 is lowered due to any cause, the valve element 68 will be forced against its seat 74 under the combined action of the spring 70 and the higher fluid pressure trapped within the chamber 62, thereby preventing depressurization of the seal arrangement through the passageway 64 as well as ingress of ground water or other comtaminants through the wall casing aperture 16 should the lip seal 54 fail.

FIGS. 7 and 8 illustrate an alternative embodiment of the invention. The body portion 24 of the hanger circuit unit 22 has formed on its convex surface an outer gasket groove 76 and an inner concentric gasket groove 78 within which are disposed gaskets 80 and 82, respectively, both of which are out of contact with the earth. A washer-like collar 84 having an inner face 86 is formed so as to abut against and conform with the outer surface of the well casing 12. If desired, a lip seal could be used at this point for extra protection. A nut 58 disposed on the threaded portion 60 of the nipple 26 functions to place the gaskets 80 and 82 in sealing engagement with the inner surface of the well casing 12.

As a result, the outer gasket 80 and the inner gasket 32 in conjunction with the well casing 12 function to define an annular pressure chamber 88 completely inside of the well casing, spaced radially from and extending about the well casing aperture 16.

The supported unit 20 in this embodiment (FIGS. 7 and 8) is formed with a hump-shaped pressurization chamber 90 at the discharge end of the supported unit passageway 34. A gasket 92 shaped to conform with the circumference of the discharge end of the passageway 34 and chamber 90 is disposed within a groove formed on the fact of the wedge plate 40 to thereby form a sealed connection between the supported unit 20 and the hanger unit 22. A seal pressurization passageway 94 is formed in the body portion 24 of the hanger unit 22 so as to communicated the chamber 90 formed in the supported unit 20 with the chamber 88 defined by the gaskets 80, 82. A check valve, like that in FIG. 1, is disposed within the passageway 94. The double inner gasket arrangement of FIGS. 7 and 8 can also be used with the seal pressurization passageway as in FIG. 3.

FIG. 9 illustrates an alternative embodiment of the supported unit illustrated in FIG. 7. In this embodiment, the supported unit 20 is formed with an intermediate passageway 98 extending from the face of the tapered wedge plate 40 to the supported unit passageway 34 and which is also coaxially aligned with the seal pressurization passageway 94 formed in the body portion 24 of the hanger unit 22. A circular groove formed around the outlet end of the passageway 98 contains a gasket 100. Beneath the gasket 100, another circular groove contains a gasket 102 formed around the discharge end of the supported unit passageway 34. Gaskets 100 and 102 insure a sealed connection between the supported unit 20 and the hanger unit 22.

As illustrated in FIG. 10, the passageway 98 of the supported unit 20 illustrated in FIG. 9 may be formed with an enlarged section defining a valve seat 104 and within which the anti-syphon valve 66 may be disposed. In this case, the hanger unit 22 would be formed with an open passageway 106 coaxially aligned with the valved passageway 98 and thereby communicating the pressurized seal chamber 88 with the supported unit passageway 34. The anti-syphon check valve 66 in this embodiment can be inspected and replaced, if necessary, by merely removing the supported unit 20 from the well casing 12 by means of the lift pipe 32. Thus repair of the anti-syphon feature is permitted without trenching down to the pitless well adapter from outside the wall casing as would be necessary for removal of the hanger unit 22.

Thus, the present invention provides a pitless adapter employing a pressurized seal capable of preventing leakage of ground water and other contaminants into a well upon seal failure as well as preventing depressurization of the seal upon reverse flow of the pumped fluid or pressure loss of any kind in the water line. The foregoing description is illustrative of the preferred and alternative embodiments only, does not limit the scope of the invention, the true spirit and scope of the present invention being determined by the appended claims.

We claim:

1. A pitless well adapter for use in a well of the type having a well casing formed with an aperture below ground level and a drop pipe within the casing connected to a pump, the interior of the drop pipe being at system pressure, comprising:

a hanger unit, said hanger unit including a tubular portion adapted to extend through the casing aperture to be connected to a delivery line and a body portion adapted to be disposed within the well casing to abut with the inner surface thereof about the casing aperture, said body portion defining a passage communication with said tubular portion;

a supported unit adapted to be connected to the drop pipe and having passage means for communicating the drop pipe with said passage of said body portion of said hanger unit thereby forming with said hanger unit an adapter passage;

means for sealingly connecting said supported unit to said hanger unit; seal means carried by said hanger unit for defining with the well casing a sealed pressure chamber surrounding the casing aperture;

seal pressurization passage means for communicating said sealed pressure chamber with system pressure in said adapter passage, at least a portion of said sealed pressurization passage means extending through said body portion of said hanger unit; and valve means disposed in said passage means for allowing an increase in system pressure to cause an increase in pressure in said sealed pressure chamber and for preventing depressurization of said sealed pressure chamber when the system pressure drops.

2. The pitless well adapter of claim 1, wherein said seal means carried by said hanger unit comprises:

a first continuous seal carried on the face of said body portion surrounding said tubular portion and positioned to abut with the inner surface of the casing about the casing aperture;

a second continuous seal disposed around said tubular portion of said hanger unit positioned to abut with the outer surface of the casing about the casing aperture; and means for drawing said first and second seals into sealing engagement with opposite sides of the casing wall about the casing aperture to define therewith said sealed pressure chamber, said pressurization passage opening into said pressure chamber between said first seal and said tubular portion.

3. The pitless well adapter of claim 1, wherein said check valve means comprises:

a movable valve element in said pressurization passage;

a valve seat formed as part of said seal pressurization passage; and spring means disposed within said seal pressurization passage for biasing said valve element against said valve seat in a direction to oppose emptying of said pressure chamber into said adapter passage.

4. The pitless well adapter of claim 1, wherein said seal means carried by said hanger unit comprises:

two continuous seals carried on the face of said body portion surrounding said tubular portion and positioned to abut with the inner surface of the casing about the casing aperture; and means for drawing said seals into sealing engagement with the inner surface of the casing about the casing aperture to define therewith said sealed pressure chamber entirely inside of the well casing, said pressurization passage opening into said chamber between said seals.

5. The pitless well adapter of claim 1 wherein said supported unit has formed therein a pressurization chamber communicating with said adapter passage, said seal pressurization passage being defined wholly within said hanger unit body portion and communicating said pressurization chamber with said sealed pressure chamber defined by said seal means.

6. The pitless well adapter defined by claim 1 wherein a portion of said seal pressurization passage extends through said supported unit to communicate said supported unit passage means with said sealed pressure chamber defined by said seal means.

7. The pitless well adapter defined by claim 6, wherein said connecting means comprises means for separately sealing said adapter passage and pressurization passage at the interface between said supported unit and said hanger unit, comprising;

a first continuous seal between said supported unit and said hanger unit surrounding said seal pressurization passage;

a second continuous seal between said supported unit and said hanger surrounding said adapter passage; and means for placing said first and second seals in sealing engagement with said hanger unit and supported unit.

8. The pitless well adapter defined by claim 6, wherein said check valve means is disposed within said portion of said seal pressurization passage formed within said supported unit.

9. A pitless well adapter for use in a well of the type having a well casing formed with an aperture below ground level and a drop pipe within the casing connected to a pump, comprising:

a hanger unit, said hanger unit including a tubular portion adapted to extend through the casing aperture to be connected to a delivery line and a body portion adapted to be disposed within the well casing to abut with the inner surface thereof about the casing aperture, said body portion defining a passage communicating with said tubular portion;

a supported unit adapted to be connected to the drop pipe and having passage means for communicating the drop pipe with said passage of said body portion of said hanger unit thereby forming with said hanger unit an adapter passage;

means for sealingly connecting said supported unit to said hanger unit;

seal means carried by said hanger unit for defining with the well casing a sealed pressure chamber surrounding the casing aperture including two continuous seals carried on the face of said body portion of said hanger unit surrounding said tubular portion and positioned to contact the inner surface of the casing about the casing aperture, and means for drawing said seals into sealing engagement with the inner surface of the casing about the casing aperture to define therewith said sealed pressure chamber entirely inside of the well casing;

a seal pressurization passage communicating said adapter passage with said sealed pressure chamber, at least a portion of said seal pressurization passage extending through said body portion of said hanger unit and opening into said sealed pressure chamber at a point on the face of said body portion between said seals.

10. A sealed fluid coupling, comprising:

a casing with an aperture below ground level;

a pipe inside of said casing, the interior of said pipe being at system pressure;

another pipe outside of said casing;

means for forming a fluid interconnection between said pipe through said casing aperture;

means for forming a pressure sealed chamber about the aperture to seal the casing against contamination;

passage means for communicating said sealed chamber with system pressure in said pipes; and valve means disposed in said passage means for allowing an increase in system pressure to cause an increase in the pressure in said sealed chamber and for preventing depressurization of said sealed chamber when the system pressure drops.

* * * * *